United States Patent
Zhuo et al.

(10) Patent No.: US 10,999,060 B2
(45) Date of Patent: May 4, 2021

(54) DATA PROCESSING METHOD AND APPARATUS

(71) Applicant: ADVANCED NEW TECHNOLOGIES CO., LTD., Grand Cayman (KY)

(72) Inventors: Haizhen Zhuo, Hangzhou (CN); Honglin Qiu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 108 days.

(21) Appl. No.: 16/504,457

(22) Filed: Jul. 8, 2019

(65) Prior Publication Data

US 2020/0136804 A1    Apr. 30, 2020

(30) Foreign Application Priority Data

Oct. 26, 2018 (CN) .......................... 201811259811.8

(51) Int. Cl.
*H04L 29/06*    (2006.01)
*H04L 9/06*    (2006.01)
*G06F 16/23*    (2019.01)
*G06F 16/901*    (2019.01)

(52) U.S. Cl.
CPC ........ *H04L 9/0637* (2013.01); *G06F 16/2358* (2019.01); *G06F 16/9027* (2019.01); *H04L 9/0643* (2013.01); *H04L 2209/38* (2013.01)

(58) Field of Classification Search
CPC . H04L 9/0637; H04L 9/0643; H04L 2209/38; H04L 9/3239; H04L 67/1097; G06F 16/2358; G06F 16/9027; G06Q 40/04
See application file for complete search history.

(56) References Cited

U.S. PATENT DOCUMENTS

| 9,256,368 | B2 | 2/2016 | Welnicki et al. |
| 2004/0220975 | A1 | 11/2004 | Carpentier et al. |
| 2006/0167969 | A1 | 7/2006 | Andreev et al. |

(Continued)

FOREIGN PATENT DOCUMENTS

| AU | 2005312895 B2 | 2/2012 |
| CN | 102819599 A | 12/2012 |

(Continued)

OTHER PUBLICATIONS

Jack Tanner, "Summary of Ethereum Upgradeable Smart Contract R&D—Part 1—2018," Mar 6, 2018, pp. 1-7. (Year: 2018).

(Continued)

*Primary Examiner* — Sher A Khan (57) ABSTRACT

Methods, system, and apparatus, including computer programs encoded on computer storage media for data processing are provided. One of the methods includes: establishing a logic contract of a blockchain and one or more data contracts corresponding to the logic contract; deploying the logic contract and the one or more data contracts in the blockchain; storing data of a target block in the blockchain into the one or more data contracts; computing a hash value of each of the one or more data contracts; and determining a hash value of the target block in the blockchain based on the hash value of each of the one or more data contracts.

20 Claims, 3 Drawing Sheets

(56) References Cited

U.S. PATENT DOCUMENTS

| | | |
|---|---|---|
| 2010/0125670 A1 | 5/2010 | Dondeti et al. |
| 2010/0161817 A1 | 6/2010 | Xiao et al. |
| 2012/0155266 A1 | 6/2012 | Patel et al. |
| 2012/0166403 A1 | 6/2012 | Kim et al. |
| 2014/0281354 A1 | 9/2014 | Tkacik et al. |
| 2017/0005804 A1 | 1/2017 | Zinder |
| 2017/0140408 A1* | 5/2017 | Wuehler ............ G06Q 30/0207 |
| 2018/0005186 A1* | 1/2018 | Hunn .................... G06F 40/103 |
| 2018/0115413 A1* | 4/2018 | King ..................... G06F 16/951 |
| 2018/0227116 A1* | 8/2018 | Chapman ............. H04L 9/0643 |
| 2019/0114182 A1* | 4/2019 | Chalakudi ............ H04L 9/0618 |
| 2019/0207770 A1* | 7/2019 | Zhou .................... H04L 9/3247 |
| 2019/0236598 A1 | 8/2019 | Padmanabhan |
| 2019/0238525 A1 | 8/2019 | Padmanabhan et al. |
| 2019/0325044 A1* | 10/2019 | Gray .................... G06F 16/284 |
| 2020/0012527 A1* | 1/2020 | Hartsock .............. H04L 9/0894 |
| 2020/0042913 A1 | 2/2020 | Kumar et al. |
| 2020/0136808 A1* | 4/2020 | Chasko ................ H04L 9/3239 |
| 2020/0366495 A1* | 11/2020 | Mahoney ........... G06Q 20/3674 |

FOREIGN PATENT DOCUMENTS

| | | |
|---|---|---|
| CN | 107688927 A | 2/2018 |
| CN | 107807991 A | 3/2018 |
| CN | 107924389 A | 4/2018 |
| CN | 108269072 A | 7/2018 |
| CN | 108596618 A | 9/2018 |
| CN | 108600163 A | 9/2018 |
| CN | 110263035 A | 9/2019 |
| JP | 2006518508 A | 8/2006 |
| JP | 5241926 B2 | 7/2013 |
| JP | 5889914 B2 | 3/2016 |
| KR | 101330392 B1 | 11/2013 |
| KR | 101954268 B1 | 3/2019 |
| WO | 2012086920 A2 | 6/2012 |
| WO | 2018149345 A1 | 8/2018 |

OTHER PUBLICATIONS

Preinterview first office action for U.S. Appl. No. 16/775,157 dated Apr. 15, 2020.
Second Written Opinion for PCT Application No. PCT/US2019/040760 dated Jun. 22, 2020.
First Search dated Feb. 22, 2020, issued in related Chinese Patent Application No. 201811259811.8 (2 pages).
First Office Action dated Mar. 5, 2020, issued in related Chinese Patent Application No. 201811259811.8, with English machine translation (8 pages).
The International Search Report and the Written Opinion of the International Searching Authority for International Application No. PCT/US2019/040760 dated Aug. 30, 2019, 68 pages.
International Preliminary Report on Patentability for PCT Application No. PCT/US2019/040760 dated Nov. 26, 2020.

* cited by examiner

DATA PROCESSING METHOD AND APPARATUS

CROSS-REFERENCE TO RELATED APPLICATIONS

This application claims priority to the Chinese patent application No. 201811259811.8 filed on Oct. 26, 2018, and entitled "Data Processing Method and Apparatus", which is incorporated herein by reference in its entirety.

TECHNICAL FIELD

This application relates to the field of Internet technologies, and in particular, to a data processing method and apparatus.

BACKGROUND

Blockchain is a new application practice of computer technologies such as distributed data storage, point-to-point transmission, consensus mechanism, and encryption algorithm, where the consensus mechanism is a mathematical algorithm for building trust and acquiring rights between different nodes in a blockchain system. A blockchain requires the state of each node in the system to be consistent.

Whether the states of the nodes in a blockchain system are consistent can be determined by comparing hash values of the nodes. Computing the hash values of the nodes involves computing a hash value of each block in the node. Consequently, the computing efficiency of the hash value of the node is associated with the computing efficiency of the hash value of the block. Therefore, a data processing method is needed to improve the computing efficiency of the hash value of the block, so as to improve the overall computing efficiency of the hash value of the node.

SUMMARY

An objective of embodiments of the specification is to provide a data processing method, system and apparatus.

In some embodiments, the present specification provides a data processing method. The method may include: establishing a logic contract of a blockchain and one or more data contracts corresponding to the logic contract; deploying the logic contract and the one or more data contracts on the blockchain; storing data of a target block in the blockchain into the one or more data contracts; computing a hash value of each of the one or more data contracts; and determining a hash value of the target block in the blockchain based on the hash value of each of the one or more data contracts.

In some embodiments, establishing the one or more corresponding data contracts comprises: when a volume of the one or more data contracts in the blockchain reaches a preset threshold, establishing a new data contract for the blockchain.

In some embodiments, establishing the logic contract comprises: separating a logic part of a smart contract of the blockchain to establish the logic contract for processing transaction logic.

In some embodiments, the method further comprises: upgrading the logic contract to upgrade the smart contract.

In some embodiments, upgrading the logic contract to upgrade the smart contract comprises: upgrading the logic contract to upgrade the smart contract without upgrading the one or more data contracts.

In some embodiments, the method further comprises: sharing the data in the one or more data contracts to other smart contracts.

In some embodiments, storing the data of the target block in the blockchain into the one or more data contracts comprises: uniformly distributing and storing the data of the target block into the one or more data contracts.

In some embodiments, computing the hash value of each of the one or more data contracts comprises: computing the hash value of each of the one or more data contracts in a parallel manner.

In some embodiments, computing the hash value of each of the one or more data contracts comprises: performing a Merkle tree hash computation on each of the one or more data contracts to compute the hash value.

In some embodiments, determining the hash value of the target block in the blockchain based on the hash value of each of the one or more data contracts: performing a hash calculation of the hash value of each of the one or more data contracts to obtain the hash value of the target block.

In some embodiments, the method further comprises: computing a hash value of the logic contract; and determining the hash value of the target block in the blockchain based on the hash value of the logic contract and the hash value of each of the one or more data contracts.

In some embodiments, determining the hash value of the target block in the blockchain based on the hash value of the logic contract and the hash value of each of the one or more data contracts: performing a hash calculation of the hash value of the logic contract and the hash value of each of the one or more data contracts to obtain the hash value of the target block.

In some embodiments, the present specification provides a system for data processing, comprising: one or more processors; and one or more computer-readable memories coupled to the one or more processors and having instructions stored thereon that are executable by the one or more processors to perform the data processing method.

In some embodiments, the present specification provides a computer program product comprising program instructions operative to be executed by a processor to cause the processor to perform the data processing method.

In some embodiments, the present specification provides an apparatus for data processing, comprising a plurality of modules for performing the data processing method.

In some embodiments, the present specification provides a non-transitory computer-readable medium having stored therein instructions that, when executed by a processor of a device, cause the device to perform the data processing method.

In some embodiments, the present specification provides a data processing apparatus. The apparatus may include: an establishing module configured to establish a logic contract of a blockchain and one or more data contracts corresponding to the logic contract; a deployment module configured to deploy the logic contract and the one or more data contracts on the blockchain; a storage module configured to store data of a target block in the blockchain into the one or more data contracts; a first computing module configured to compute a hash value of each of the one or more data contracts; and a determining module configured to determine a hash value of the target block in the blockchain based on the hash value of each of the one or more data contracts.

In some embodiments, the present specification provides a non-transitory computer-readable storage medium. The non-transitory computer-readable storage medium may be configured with instructions executable by one or more processors to cause the one or more processors to perform operations. The operations may include: establishing a logic contract of a blockchain and one or more data contracts corresponding to the logic contract; deploying the logic contract and the one or more data contracts on the blockchain; storing data of a target block in the blockchain into the one or more data contracts; computing a hash value of each of the one or more data contracts; and determining a hash value of the target block in the blockchain based on the hash value of each of the one or more data contracts.

In some embodiments, the present specification provides a data processing apparatus. The apparatus may include: one or more processors and one or more non-transitory computer-readable memories. The one or more non-transitory computer-readable memories may be coupled to the one or more processors and configured with instructions executable by the one or more processors to cause the system to perform operations. The operations may include: establishing a logic contract of a blockchain and one or more contracts corresponding to the logic contract; deploying the logic contract and the one or more data contracts on the blockchain; storing data of a target block in the blockchain into the one or more data contracts; computing a hash value of each of the one or more data contracts; and determining a hash value of the target block in the blockchain based on the hash value of each of the one or more data contracts.

When computing the hash value of a block in a blockchain, if all data of the block is stored in one contract, the computing efficiency of the hash value computing algorithm (such as a Merkle tree algorithm) decreases as the amount of data in the contract increases, resulting in a relatively low computing efficiency of the hash value of the block. In some embodiments of the specification, when computing the hash value of a block in a blockchain, a smart contract can be separated into a logic contract and one or more data contracts, and all data of the block is distributed and stored in the one or more data contracts, so that the computing efficiency of the hash value computing algorithm for the hash value of each single contract can be improved, thereby improving the computing efficiency of the hash value of the block, and further improving the overall computing efficiency of the hash value of the node.

BRIEF DESCRIPTION OF THE DRAWINGS

By reading the following detailed description of preferred implementation manners, a variety of other advantages and benefits will become clear to persons having ordinary skill in the art. The drawings are merely illustrative, and are not to be taken as limiting.

DETAILED DESCRIPTION

To help a person skilled in the art better understand the technical solutions in the specification, the following describes the technical solutions in the embodiments of the specification with reference to the accompanying drawings. The described embodiments are only some, rather than all, of the embodiments of the specification. All other embodiments obtained by a person of ordinary skill in the art based on the embodiments in the specification shall fall within the protection scope of the specification.

In some embodiments, a process of computing the hash value of a blockchain node is as follows: for example, a blockchain includes N blocks, which are block 1, block 2, block 3, . . . , and block N, respectively. First, a hash value of block 1 is computed according to the data in block 1; then a hash value of block 2 is computed according to the hash value of block 1 and the data in block 2; next, a hash value of block 3 is computed according to the hash value of block 2 and the data in block 3. The other hash values can be computed in a similar way, such as the hash value of block N, which is also the hash value of the blockchain node. The Merkle tree algorithm is an example of an algorithm for computing the hash values.

When computing the hash value of a block, the data of the block is stored into a smart contract, and a Merkle tree hash computation is performed on the data, to obtain the hash value of the block. However, the computing efficiency of the Merkle tree decreases as the amount of data in contracts increases, resulting in a relatively low computing efficiency of the hash value of a block. In order to resolve the foregoing technical problem, the embodiments of the specification provide a data processing method and apparatus.

Some terminologies involved in the embodiments of the specification are described in the following.

Blockchain technology: also known as distributed ledger technology, is a decentralized distributed database technology characterized by decentralization, transparency, non-tampering, and trustworthiness. Each piece of data in a blockchain is broadcast to all blockchain nodes of the entire network to ensure completeness and consistency among the blockchain nodes. That is, the state of each node needs to be consistent, including the database state. This requires that the order in which an application executes blockchain transactions is orderly and consistent across nodes, so that each node can obtain the same data state.

Block: Each block records a hash value of the preceding block, a transaction set of the current block, a hash value of the current block, and other basic data. Since each block includes a hash value of the preceding block, every two adjacent blocks are connected by the hash value, thereby forming a blockchain.

Transaction: Data received by a blockchain is referred to as a transaction.

Merkle tree: The Merkle tree is a data structure that can perform a hash computation on an organized structure.

State: The state represents a data set stored by a blockchain, including the blockchain data and the data of each account and smart contract after execution of a blockchain transaction.

State hash: The hash value of the entire state's data can be computed by using a hash algorithm. States of all nodes of a distributed blockchain should be consistent, and whether states are consistent is determined by comparing state hash values.

A data processing method is described below.

The method provided in the embodiments of the specification can be applied to a blockchain platform of private blockchains, consortium blockchains, and public blockchains that support a smart contract and a Merkle tree.

Figure 1:
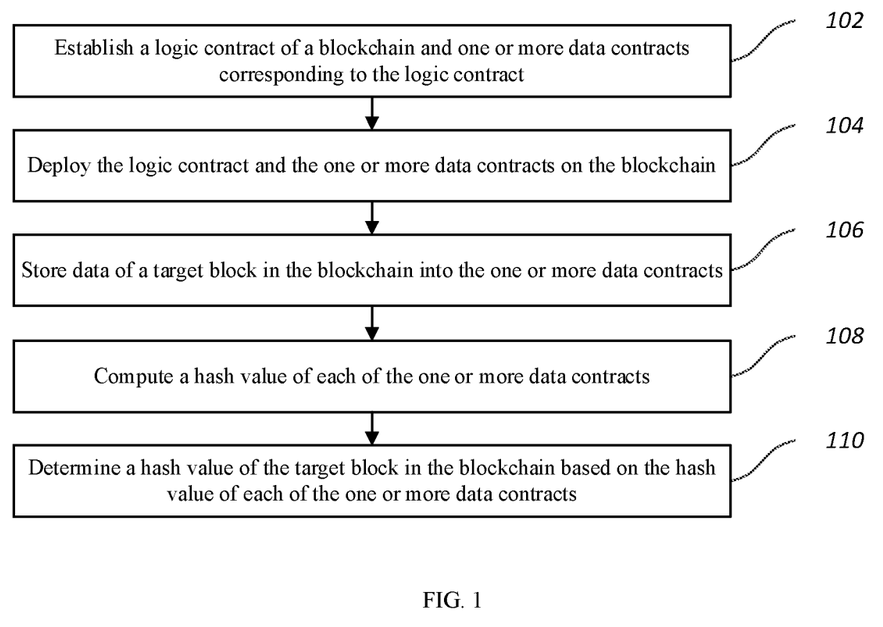
FIG. 1 is a flowchart of a data processing method, according to some embodiments of the specification.

FIG. 1 is a flowchart of a data processing method according to some embodiments. As shown in FIG. 1, the method may include the following steps: step 102, step 104, step 106, step 108, and step 110.

In step 102, a logic contract of a blockchain and a plurality of corresponding data contracts are established.

In some embodiments, a smart contract can be separated into a logic contract and a plurality of data contracts. For example, a logic part of the smart contract is separated, and a corresponding logic contract is established. During establishing of the logic contract, a plurality of corresponding data contracts are established. The logic contract is used for processing transaction logic, and the data contracts are used for storing data.

In an example, one logic contract and three data contracts are established.

In some embodiments, the smart contract is separated into the logic contract and the data contracts. When upgrading the smart contract, only the logic contract needs to be upgraded, while the data contracts do not need to be upgraded. Correspondingly, the method may further include: upgrading the logic contract, so as to upgrade a smart contract of the blockchain.

In some embodiments, upgrading the logic contract to upgrade the smart contract comprises: upgrading the logic contract to upgrade the smart contract without upgrading the one or more data contracts.

In some embodiments, the smart contract is separated into the logic contract and the data contracts. Data in the data contracts can be shared to other smart contracts conveniently. Correspondingly, the method may further include: sharing the data in the data contracts to other smart contracts.

In step 104, the logic contract and the plurality of data contracts are deployed on the blockchain.

In step 106, data of a target block in the blockchain is stored into the plurality of data contracts.

In some embodiments, the target block may be any block in the blockchain.

In some embodiments, in order to improve the computing efficiency, the data of the target block can be stored into the plurality of data contracts uniformly, that is, the amount of data stored in each data contract is similar, while the data stored in each data contract may be different.

For example, the data of the target block is stored into the three data contracts. In some embodiments, the data of the target block is stored into the three data contracts uniformly.

In some embodiments, if the target block is the first block in the blockchain, the data of the target block is the data in the target block. If the target block is not the first block in the blockchain, the data of the target block includes the data in the target block and a hash value of the preceding block.

In step 108, hash values of the plurality of data contracts are computed. In some embodiments, computing the hash value of each of the one or more data contracts comprises: performing a Merkle tree hash computation on each of the one or more data contracts to compute the hash value.

In one embodiment, for each data contract that stores block data, a Merkle tree hash computation is performed on the data contract, to obtain a hash value of the data contract.

In another embodiment, since the correlation between data contracts is relatively low, hash values of the plurality of data contracts can be computed in a parallel manner, that is, the hash values of the plurality of data contracts can be computed simultaneously, so as to improve the computing efficiency.

For example, after the data of the target block is stored into the three data contracts uniformly, hash values of data contract 1, data contract 2, and data contract 3 can be computed simultaneously.

In step 110, a hash value of the target block in the blockchain is determined based on the hash values of the plurality of data contracts.

In some embodiments, since a data contract usually has a large amount of data and a logic contract usually has a small amount of data, the hash value of the target block may be computed according to the hash values of the data contracts only. In some embodiments, determining the hash value of the target block in the blockchain based on the hash value of each of the one or more data contracts: performing a hash calculation of the hash value of each of the one or more data contracts to obtain the hash value of the target block. For example, the hash value (e.g., state hash) of the target block may be determined as an output of subjecting a concatenation of the hash values of the data contracts to a hash function or algorithm.

In some embodiments, the hash value of the target block may also be computed by combining a hash value of the logic contract and the hash values of the data contracts. In this case, the method may further include: computing a hash value of the logic contract. Correspondingly, step 110 may include the following step: determining the hash value of the target block in the blockchain based on the hash value of the logic contract and the hash values of the plurality of data contracts. In some embodiments, determining the hash value of the target block in the blockchain based on the hash value of the logic contract and the hash value of each of the one or more data contracts: performing a hash calculation of the hash value of the logic contract and the hash value of each of the one or more data contracts to obtain the hash value of the target block. For example, the hash value (e.g., state hash) of the target block may be determined as an output of subjecting a concatenation of the hash value of the logic contract and the hash values of the data contracts to a hash function or algorithm.

Figure 2:
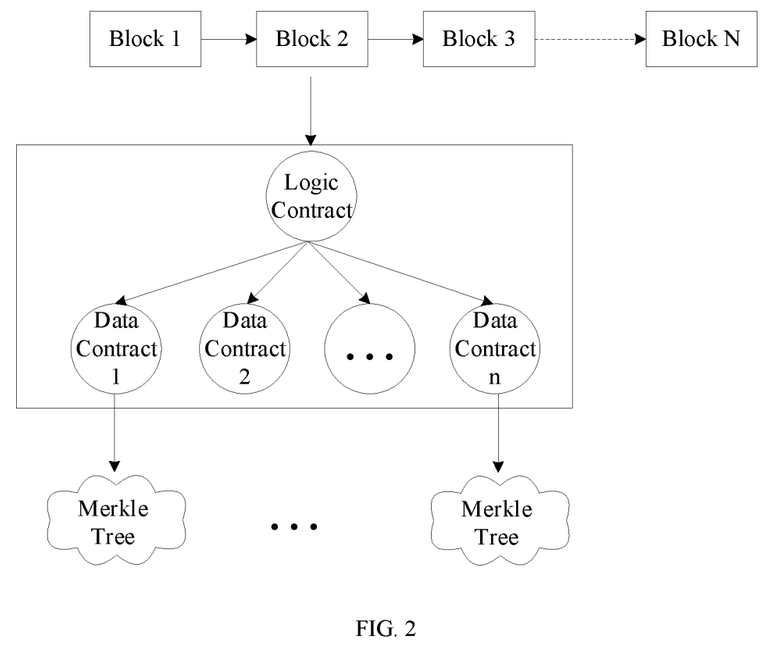
FIG. 2 is a diagram of a data processing method, according to some embodiments of the specification.

In an example, as shown in FIG. 2, a blockchain includes block 1, block 2, block 3, . . . , and block N. When computing the hash value of each block, the data of the block is stored into n data contracts, where n is the number of data contracts. For example, when computing a hash value of block 2, the data of block 2 is stored into n data contracts, and then a Merkle tree hash computation is performed on the n data contracts to obtain n hash values. The hash value of block 2 is determined according to the obtained n hash values.

As shown above, when computing the hash value of a block in a blockchain, if all data of the block is stored in one contract, the computing efficiency of a hash value computing algorithm (such as a Merkle tree algorithm) decreases sharply as the amount of data in the contract increases, resulting in a relatively low computing efficiency of the hash value of the block. In some embodiments, when computing the hash value of a block in a blockchain, a smart contract is separated into a logic contract and a plurality of data contracts, and all data of the block is distributed and stored in the plurality of data contracts. Consequently, the computing efficiency of the hash value of a single contract by the hash value computing algorithm can be improved, thereby improving the computing efficiency of the hash value of the block, and further improving the overall computing efficiency of the hash value of a node.

Figure 3:
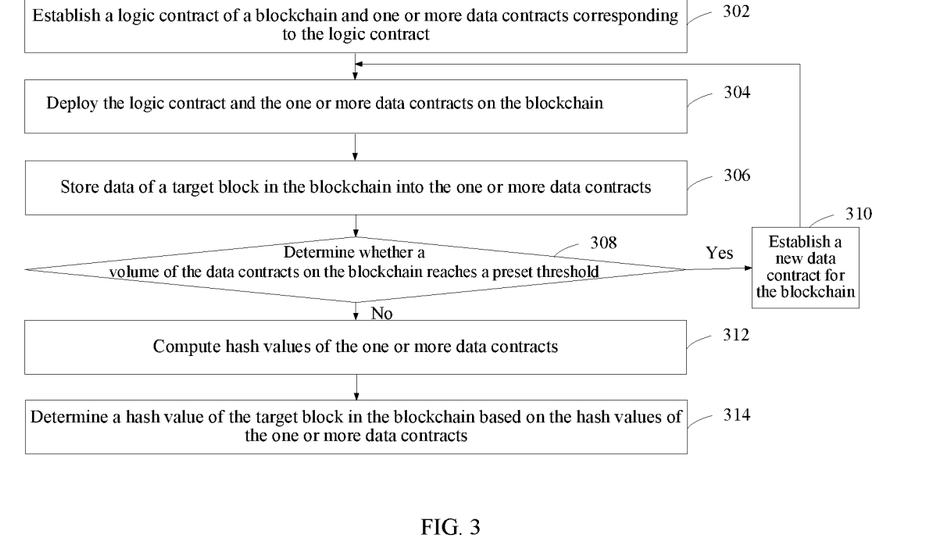
FIG. 3 is a flowchart of a data processing method, according to some embodiments of the specification.

FIG. 3 is a flowchart of a data processing method according to another embodiment of the specification. In some embodiments, the quantity of data contracts can be expanded dynamically according to a transaction volume and a transaction rule. In this case, as shown in FIG. 3, the method may include the following steps: step 302, step 304, step 306, step 308, step 310, step 312, and step 314.

In step 302, a logic contract of a blockchain and a plurality of corresponding data contracts are established.

In some embodiments, a smart contract can be separated into a logic contract and data contracts. For example, a logic part of the smart contract is separated, and a corresponding logic contract is established. During establishing of the logic contract, a plurality of corresponding data contracts are established. The logic contract is used for processing transaction logic, and the data contracts are used for storing data.

For example, one logic contract and three data contracts are established.

In some embodiments, the smart contract is separated into the logic contract and the data contracts. When upgrading the smart contract, only the logic contract needs to be upgraded, while the data contracts do not need to be upgraded. Correspondingly, the method may further include: upgrading the logic contract, so as to upgrade a smart contract of the blockchain.

In some embodiments, the smart contract is separated into the logic contract and the data contracts. Data in the data contracts can be shared to other smart contracts conveniently. Correspondingly, the method may further include: sharing the data in the data contracts to other smart contracts.

In step 304, the logic contract and the plurality of data contracts are deployed on the blockchain.

In step 306, the data of a target block in the blockchain is stored into the plurality of data contracts.

In some embodiments, the target block may be any block in the blockchain.

In some embodiments, in order to improve the computing efficiency, the data of the target block can be stored into the plurality of data contracts uniformly, that is, the amount of data stored in each data contract is similar, while the data stored in each data contract may be different.

In some embodiments, the data of the target block is stored into the three data contracts. For example, the data of the target block is stored into the three data contracts uniformly.

In some embodiments, if the target block is the first block in the blockchain, the data of the target block is the data in the target block. If the target block is not the first block in the blockchain, the data of the target block includes the data in the target block and a hash value of the preceding block.

In step 308, whether a volume of the data contracts in the blockchain reaches a preset threshold may be determined. If the volume reaches the threshold, step 310 is performed; otherwise, step 312 is performed.

In some embodiments, whether the data contracts in the blockchain reach a computing bottleneck may be determined by determining whether the volume of the data contracts in the blockchain reaches a preset threshold. If the volume of the data contracts reaches the preset threshold, the data contracts have reached the computing bottleneck. In this case, a new data contract can be established and deployed on the blockchain. Then, the data is stored into the newly established data contract, so as to avoid a drop in the efficiency of Merkle tree hash computation caused by a large amount of data.

In step 310, a new data contract is established for the blockchain.

In step 312, hash values of the plurality of data contracts are computed.

In some embodiments, for each data contract that stores block data, a Merkle tree hash computation is performed on the data contract, to obtain a hash value of the data contract.

In some embodiments, since the correlation between data contracts is relatively low, hash values of the plurality of data contracts can be computed in a parallel manner (e.g., temporally in parallel), that is, the hash values of the plurality of data contracts are computed simultaneously, so as to improve the computing efficiency.

For example, after the data of the target block is stored into three data contracts uniformly, hash values of data contract 1, data contract 2, and data contract 3 can be computed simultaneously.

In step 314, a hash value of the target block in the blockchain is determined based on the hash values of the plurality of data contracts.

In some embodiments, since the data contracts usually have a large amount of data and the logic contract usually has a small amount of data, the hash value of the target block may be computed according to the hash values of the data contracts only.

In some embodiments, the hash value of the target block may also be computed by combining a hash value of the logic contract and the hash values of the data contracts. In this case, the method may further include: computing a hash value of the logic contract. Correspondingly, step 314 may include the following step: determining the hash value of the target block in the blockchain based on the hash value of the logic contract and the hash values of the plurality of data contracts.

As seen from above, the quantity of data contracts can be adjusted dynamically based on a data amount. When current data contracts reach a computing bottleneck, the computing efficiency of the hash value of a block can be improved by establishing a new data contract, thereby improving the overall computing efficiency of a hash value of a node.

Figure 4:
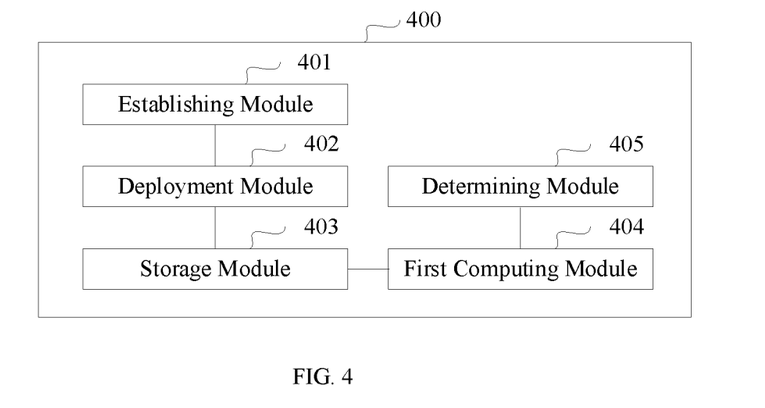
FIG. 4 is a schematic structural diagram of a data processing apparatus, according to some embodiments of the specification.

FIG. 4 is a schematic structural diagram of a data processing apparatus according to some embodiments. As shown in FIG. 4, in a software implementation, a data processing apparatus 400 may include an establishing module 401, a deployment module 402, a storage module 403, a first computing module 404, and a determining module 405.

The establishing module 401 is configured to establish a logic contract of a blockchain and a plurality of corresponding data contracts.

The deployment module 402 is configured to deploy the logic contract and the plurality of data contracts on the blockchain.

The storage module 403 is configured to store data of a target block in the blockchain into the plurality of data contracts.

The first computing module 404 is configured to compute hash values of the plurality of data contracts.

The determining module 405 is configured to determine a hash value of the target block in the blockchain based on the hash values of the plurality of data contracts.

When computing a hash value of a block in a blockchain, if all data of the block is stored in one contract, the computing efficiency of a hash value computing algorithm (such as a Merkle tree algorithm) decreases sharply as the amount of data in the contract increases, resulting in a relatively low computing efficiency of the hash value of the block. In some embodiments, when computing a hash value of a block in a blockchain, a smart contract is separated into a logic contract and a plurality of data contracts, and all data of the block is distributed and stored in the plurality of data contracts, so that the computing efficiency of the hash value computing algorithm for a hash value of a single contract can be improved, thereby improving the computing efficiency of the hash value of the block, and further improving the overall computing efficiency of a hash value of a node.

In one embodiment, the establishing module 401 is further configured to, if a volume of the data contracts in the blockchain reaches a preset threshold, establish a new data contract for the blockchain.

In another embodiment, the data processing apparatus 400 may further include: an upgrading module configured to upgrade the logic contract, so as to upgrade a smart contract of the blockchain.

In yet another embodiment, the data processing apparatus 400 may further include: a sharing module configured to share the data in the data contracts to other smart contracts.

In some embodiments, the storage module 403 may include: a data storage sub-module configured to uniformly store data of the target block in the blockchain into the plurality of data contracts.

In some embodiments, the first computing module 404 may include: a computing sub-module configured to compute the hash values of the plurality of data contracts in a parallel manner.

In some embodiments, the data processing apparatus 400 may further include: a second computing module configured to compute a hash value of the logic contract, where the determining module 405 may include: a hash value determining sub-module configured to determine the hash value of the target block in the blockchain based on the hash value of the logic contract and the hash values of the plurality of data contracts.

In some embodiments, the various modules and units of data processing apparatus 400 may be implemented as software instructions or a combination of software and hardware. For example, data processing apparatus 400 (also referred to as a data processing system) may comprise one or more processors (e.g., a CPU) and one or more non-transitory computer-readable storage memories coupled to the one or more processors and configured with instructions executable by the one or more processors to cause one or more components (e.g., the one or more processors) of the apparatus (or system) to perform various steps and methods of the modules and units described above. In some embodiments, the data processing apparatus 400 may include a server, a mobile phone, a tablet computer, a PC, a laptop computer, another computing device, or a combination of one or more of these computing devices.

Figure 5:
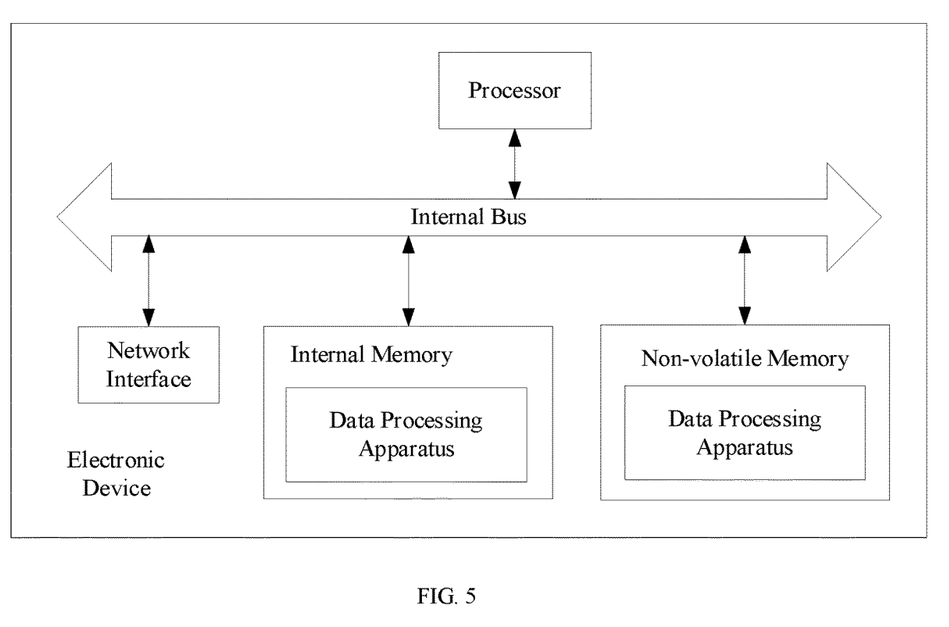
FIG. 5 is a schematic structural diagram of an electronic device, according to some embodiments of the specification.

FIG. 5 is a schematic structural diagram of an electronic device according to some embodiments. As shown in FIG. 5, on the hardware level, the electronic device includes a processor, and optionally further includes an internal bus, a network interface, and a memory. The memory may include an internal memory, such as a high-speed random-access memory (RAM), and may further include a non-volatile memory, such as at least one magnetic disk memory. The electronic device may further include other hardware required by transactions.

The processor, the network interface, and the memory may be mutually connected through an internal bus. The internal bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of illustration, the bus in FIG. 5 is represented by using only one double-headed arrow, but it does not mean that there is only one bus or one type of bus.

The memory is configured to store a program. For example, the program may include program code, and the program code includes a computer operation instruction. The memory may include an internal memory and a non-volatile memory, and provides an instruction and data to the processor.

The processor reads a corresponding computer program from the non-volatile memory into the internal memory and then runs the computer program, to form a data processing apparatus on the logical level. The processor executes the program stored in the memory, and is configured to perform the following operations: establishing a logic contract of a blockchain and a plurality of corresponding data contracts; deploying the logic contract and the plurality of data contracts on the blockchain; storing data of a target block in the blockchain into the plurality of data contracts; computing hash values of the plurality of data contracts; and determining a hash value of the target block in the blockchain based on the hash values of the plurality of data contracts.

In one embodiment, the establishing a plurality of corresponding data contracts further includes: if a volume of the data contracts in the blockchain reaches a preset threshold, establishing a new data contract for the blockchain.

In another embodiment, the method further includes: upgrading the logic contract, so as to upgrade a smart contract of the blockchain.

In yet another embodiment, the method further includes: sharing the data in the data contracts to other smart contracts.

In still another embodiment, storing the data of the target block in the blockchain into the plurality of data contracts includes: uniformly storing data of the target block in the blockchain into the plurality of data contracts.

In some embodiments, the computing hash values of the plurality of data contracts includes: computing the hash values of the plurality of data contracts in a parallel manner.

In some embodiments, the method further includes: computing a hash value of the logic contract, where the determining a hash value of the target block in the blockchain based on the hash values of the plurality of data contracts includes: determining the hash value of the target block in the blockchain based on the hash value of the logic contract and the hash values of the plurality of data contracts.

The foregoing method executed by the data processing apparatus disclosed in the embodiment shown in FIG. 5 of the specification may be applied in a processor or implemented by a processor. The processor may be an integrated circuit chip with a signal processing capability. In an implementation process, steps of the foregoing method may be completed by using a hardware integrated logical circuit in the processor or an instruction in a form of software. The foregoing processor may be a general processing unit, including a central processing unit (CPU), a network processor (NP), or the like, or may be a digital signal processor (DSP), an application-specific integrated circuit (ASIC), a field-programmable gate array (FPGA), or another programmable logic device, discrete gate or transistor logic device, or discrete hardware assembly, and may implement or execute methods, steps, and logical block diagrams disclosed in the embodiments of the specification. The general processing unit may be a microprocessor, or the processor may be any regular processor, or the like. In combination with the methods disclosed in the embodiments of the specification, steps may be represented directly as being implemented by a hardware decoding processor, or implemented by a combination of hardware and software modules in a decoding processor. The software module may be located in a mature storage medium in the art, such as a RAM, a flash memory, a read-only memory, a programmable read-only memory, an electrically erasable programmable memory, a register, or the like. The storage medium is located in the memory, and the processor reads information in the memory and completes the steps of the foregoing methods in combination with hardware thereof.

The electronic device may further execute the method in FIG. 1, and implement functions of the data processing apparatus in the embodiment shown in FIG. 1. Details are not described again.

An embodiment of the specification further provides a computer-readable storage medium. The computer-readable storage medium stores one or more programs. The one or more programs include an instruction. When executed by a portable electronic device including multiple application programs, the instruction can enable the portable electronic device to execute the method in the embodiment shown in FIG. 1 and execute the following method:

establishing a logic contract of a blockchain and a plurality of corresponding data contracts;

deploying the logic contract and the plurality of data contracts on the blockchain;

storing data of a target block in the blockchain into the plurality of data contracts;

computing hash values of the plurality of data contracts; and determining a hash value of the target block in the blockchain based on the hash values of the plurality of data contracts.

In one embodiment, the establishing a plurality of corresponding data contracts further includes: if a volume of the data contracts in the blockchain reaches a preset threshold, establishing a new data contract for the blockchain. Establishing the logic contract may include: separating a logic part of a smart contract of the blockchain to establish the logic contract for processing transaction logic.

In another embodiment, the method further includes: upgrading the logic contract, so as to upgrade a smart contract of the blockchain.

In yet another embodiment, the method further includes: sharing the data in the data contracts to other smart contracts.

In still another embodiment, storing the data of the target block in the blockchain into the plurality of data contracts includes: uniformly storing data of the target block in the blockchain into the plurality of data contracts.

In some embodiments, the computing hash values of the plurality of data contracts includes: computing the hash values of the plurality of data contracts in a parallel manner.

In some embodiments, the method further includes: computing a hash value of the logic contract, where the determining a hash value of the target block in the blockchain based on the hash values of the plurality of data contracts includes: determining the hash value of the target block in the blockchain based on the hash value of the logic contract and the hash values of the plurality of data contracts.

In conclusion, the foregoing descriptions are merely preferred embodiments of the specification, and are not intended to limit the protection scope of the specification. Any modifications, equivalent replacements, and improvements made within the spirit and principle of the specification shall fall within the protection scope of the specification.

The system, apparatus, module, or unit illustrated in the foregoing embodiments may be implemented by a computer chip or an entity, or by a product with a particular function. An example of an implementation device is a computer. The computer may be, for example, a personal computer, a laptop computer, a cellular phone, a camera phone, a smart phone, a personal digital assistant, a media player, a navigation device, an e-mail device, a game console, a tablet computer, a wearable device, or a combination of any of the foregoing devices.

The computer-readable medium includes persistent and non-persistent, removable and non-removable medium, and can implement information storage by using any method or technology. Information may be a computer-readable instruction, a data structure, a program module, or other data. An example of a computer storage medium includes, but is not limited to, a phase change memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette tape, magnetic tape/magnetic disk storage or any other non-transmission medium. The storage medium may be configured to store information accessible to a computing device. As defined in the specification, the computer-readable medium does not include a transitory computer-readable medium (transitory media), such as a modulated data signal and a carrier.

The terms "include", "comprise", or any variants thereof are intended to cover a non-exclusive inclusion. Therefore, a process, method, product, or device including a series of elements not only includes such elements, but also includes other elements not specified expressly, or may include inherent elements of the process, method, commodity or device. Without more limitations, an element limited by "include a/an . . . " does not exclude other identical elements existing in a process, method, commodity or device that includes the element.

The embodiments in the specification are all described in a progressive manner, and reference may be made to each other for the same or similar parts among respective embodiments. Description of each embodiment focuses on differences from other embodiments. The system embodiment is described in a relatively simple manner because the system embodiment is similar to the method embodiment. For related parts, reference may be made to the partial description of the method embodiments.

What is claimed is:

1. A data processing method, comprising:
    establishing a logic contract of a blockchain and one or more data contracts corresponding to the logic contract by:
        separating a logic part of a smart contract of the blockchain to establish the logic contract, and
        when a volume of data contracts in the blockchain reaches a preset threshold, establishing a new data contract, wherein the established one or more data contracts comprise the new data contract;
    deploying the logic contract and the one or more data contracts on the blockchain;
    storing data of a target block in the blockchain into the one or more data contracts;
    computing a hash value of each of the one or more data contracts;
    computing a hash value of the logic contract; and determining a hash value of the target block in the blockchain based on the hash value of the logic contract and the hash value of each of the one or more data contracts.

2. The method of claim 1, further comprising:
upgrading the logic contract to upgrade the smart contract.

3. The method of claim 2, wherein upgrading the logic contract to upgrade the smart contract comprises:
upgrading the logic contract to upgrade the smart contract without upgrading the one or more data contracts.

4. The method of claim 1, further comprising:
sharing the data in the one or more data contracts to other smart contracts.

5. The method of claim 1, wherein storing the data of the target block in the blockchain into the one or more data contracts comprises:
uniformly distributing and storing the data of the target block into the one or more data contracts.

6. The method of claim 5, wherein computing the hash value of each of the one or more data contracts comprises:
computing the hash value of each of the one or more data contracts in a parallel manner.

7. The method of claim 1, wherein computing the hash value of each of the one or more data contracts comprises:
performing a Merkle tree hash computation on each of the one or more data contracts to compute the hash value.

8. The method of claim 1, wherein determining the hash value of the target block in the blockchain based on the hash value of each of the one or more data contracts comprises:
performing a hash calculation of the hash value of each of the one or more data contracts to obtain the hash value of the target block.

9. The method of claim 1, wherein determining the hash value of the target block in the blockchain based on the hash value of the logic contract and the hash value of each of the one or more data contracts comprises:
performing a hash calculation of the hash value of the logic contract and the hash value of each of the one or more data contracts to obtain the hash value of the target block.

10. A non-transitory computer-readable storage medium configured with instructions executable by one or more processors to cause the one or more processors to perform operations comprising:
establishing a logic contract of a blockchain and one or more data contracts corresponding to the logic contract by:
separating a logic part of a smart contract of the blockchain to establish the logic,
and
when a volume of the data contracts in the blockchain reaches a preset threshold, establishing a new data contract, wherein the established one or more data contracts comprise the new data contract;
deploying the logic contract and the one or more data contracts on the blockchain;
storing data of a target block in the blockchain into the one or more data contracts;
computing a hash value of each of the one or more data contracts;
computing a hash value of the logic contract; and
determining a hash value of the target block in the blockchain based on the hash value of the logic contract and the hash value of each of the one or more data contracts.

11. The non-transitory computer-readable storage medium of claim 10, wherein the operations further comprise:
upgrading the logic contract to upgrade the smart contract; and
sharing the data in the one or more data contracts to other smart contracts.

12. The non-transitory computer-readable storage medium of claim 11, wherein upgrading the logic contract to upgrade the smart contract comprises:
upgrading the logic contract to upgrade the smart contract without upgrading the one or more data contracts.

13. The non-transitory computer-readable storage medium of claim 10, wherein the operations further comprise:
sharing the data in the one or more data contracts to other smart contracts.

14. The non-transitory computer-readable storage medium of claim 10, wherein storing the data of the target block in the blockchain into the one or more data contracts comprises:
uniformly distributing and storing the data of the target block into the one or more data contracts.

15. The non-transitory computer-readable storage medium of claim 14, wherein computing the hash value of each of the one or more data contracts comprises:
computing the hash value of each of the one or more data contracts in a parallel manner.

16. A data processing apparatus, comprising one or more processors and one or more non-transitory computer-readable memories coupled to the one or more processors and configured with instructions executable by the one or more processors to cause the system to perform operations comprising:
establishing a logic contract of a blockchain and one or more data contracts corresponding to the logic contract by:
separating a logic part of a smart contract of the blockchain to establish the logic contract, and
when a volume of the data contracts in the blockchain reaches a preset threshold, establishing a new data contract, wherein the established one or more data contracts comprise the new data contract;
deploying the logic contract and the one or more data contracts on the blockchain;
storing data of a target block in the blockchain into the one or more data contracts;
computing a hash value of each of the one or more data contracts;
computing a hash value of the logic contract; and
determining a hash value of the target block in the blockchain based on the hash value of the logic contract and the hash value of each of the one or more data contracts.

17. The data processing apparatus of claim 16, wherein the operations further comprise:
upgrading the logic contract to upgrade the smart contract; and
sharing the data in the one or more data contracts to other smart contracts.

18. The data processing apparatus of claim 16, wherein upgrading the logic contract to upgrade the smart contract comprises:
upgrading the logic contract to upgrade the smart contract without upgrading the one or more data contracts.

19. The data processing apparatus of claim 16, wherein the operations further comprise:

sharing the data in the one or more data contracts to other smart contracts.

20. The data processing apparatus of claim 19, wherein storing the data of the target block in the blockchain into the one or more data contracts comprises:
uniformly distributing and storing the data of the target block into the one or more data contracts.

* * * * *